United States Patent [19]

Shealy

[11] 3,949,826
[45] Apr. 13, 1976

[54] LUBRICATION SYSTEM FOR TRUNNION MOUNTED AXLE

[75] Inventor: Noah A. Shealy, Niles, Mich.

[73] Assignee: Clark Equipment Company, Buchanan, Mich.

[22] Filed: May 23, 1975

[21] Appl. No.: 580,257

[52] U.S. Cl. ............... 180/88; 184/6.12; 280/111; 308/94
[51] Int. Cl.² .......................................... B60G 9/02
[58] Field of Search ...... 180/42, 43 R, 44 R, 47–50, 180/88; 280/111; 184/6.12; 74/710; 308/94

[56] References Cited
UNITED STATES PATENTS

| | | | |
|---|---|---|---|
| 844,159 | 2/1907 | Ludford | 308/94 |
| 1,405,159 | 1/1922 | Polaski | 180/42 |
| 1,438,251 | 12/1922 | McKinnon | 308/94 |
| 3,481,421 | 12/1969 | Sullivan | 180/75 |
| 3,702,196 | 11/1972 | Krotis | 280/111 |
| 3,811,699 | 5/1974 | Casey | 280/111 |

Primary Examiner—M. H. Wood, Jr.
Assistant Examiner—Terrance L. Siemens
Attorney, Agent, or Firm—Ernst H. Ruf

[57] ABSTRACT

A vehicle having a swing axle, front and rear trunnion bearing assemblies for supporting this axle and front and rear trunnion supports wherein the trunnion supports each take the form of a cored or hollow casting that is filled with lubricating fluid and thus acts as a fluid reservoir. First passage means in fluid communication with the trunnion bearings permit the flow of lubricating fluid from the reservoir to the trunnion bearings, with second passage means providing fluid communication with the trunnion bearings and a pair of thrust bearings.

10 Claims, 2 Drawing Figures

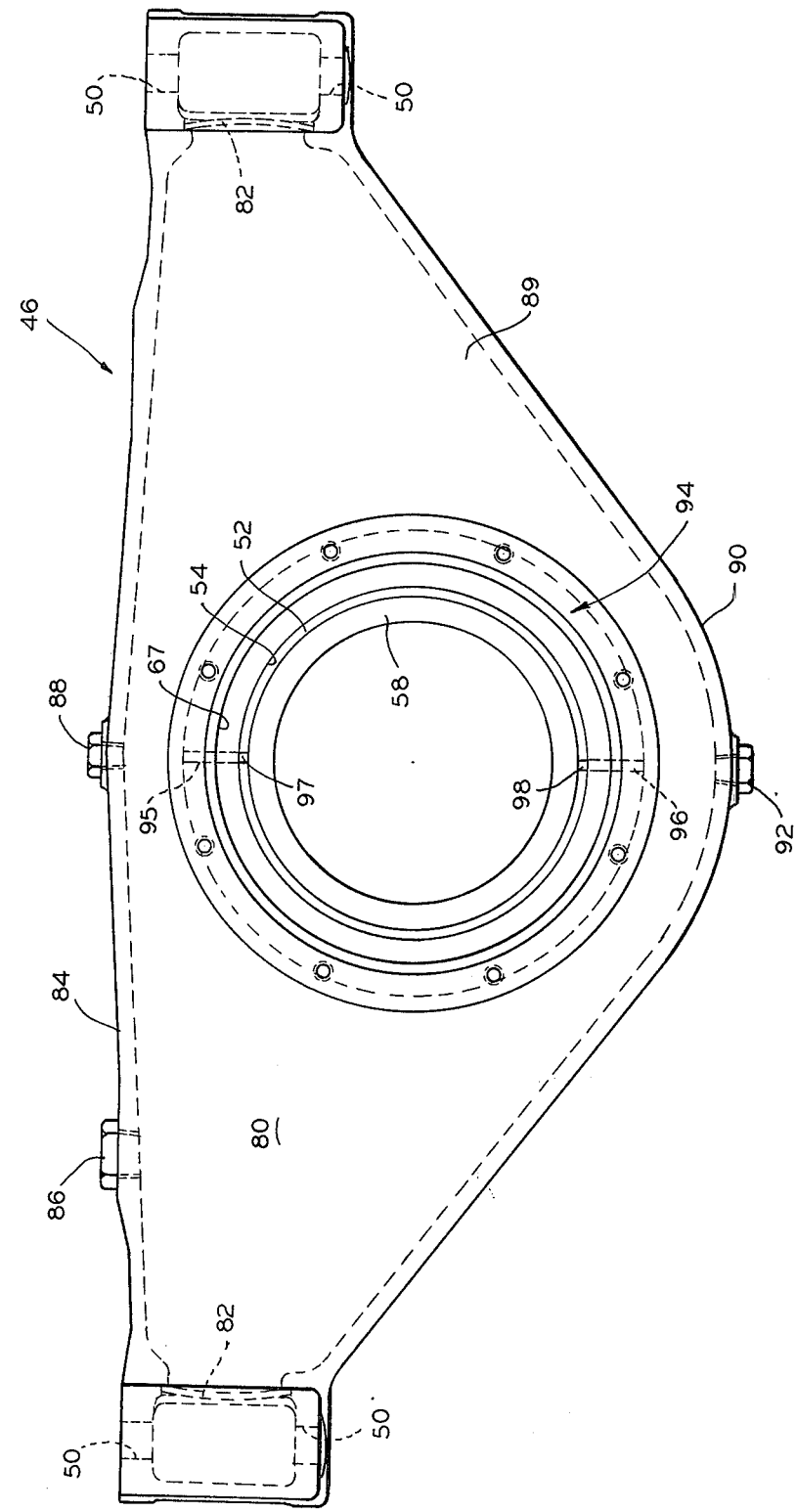

LUBRICATION SYSTEM FOR TRUNNION MOUNTED AXLE

BACKGROUND OF THE INVENTION

1. Field of the Invention

The present invention relates to oscillating drive axles for vehicles, industrial as industrail tractors or the like, and more particularly to the lubrication system for the trunnion bearing assemblies for pivotally mounting axles on these types of vehicles. One or more axles of the vehicles may be pivotally attached to the vehicle body so as to accommodate movement of the vehicle over rough terrain. These axles are commonly attached to the vehicle frame by means of a trunnion bearing assembly.

2. Description of the Prior Art

It is known to provide oscillating drive axle structures for large off-the-road wheeled vehicles so that all four drive wheels will stay in contact with the ground regardless of the unevenness of the terrain. It is also known to mount the entire axle structure, including the differential housing, on a pair of longitudinally spaced bearings carried by support members bolted to the frame and disposed in fore-and-aft alignment on the front and rear sides of the differential housing, with the axle structure therefore oscillating about the fore-and-aft axis of the bearings.

Lubrication for such bearings is important, however, since the bearings are located underneath the vehicle, they present a problem both in terms of access and in terms of safety for the maintenance men who may have to crawl under the vehicle to service said bearings. The prior art, which teaches lubrication via the usual grease fittings, is exemplified by U.S. Pat. No. 3,702,196, issued Nov. 7, 1972 to Krutis and, U.S. Pat. No. 3,811,699, issued May 21, 1974 to Casey.

Another method for lubricating the trunnion bearings is disclosed in U.S. Pat. No. 3,481,421, issued Dec. 2, 1969 to Sullivan, wherein the oscillating axle bearings are lubricated automatically by using the oil within the differential housing. While this prior art structure tends to perform quite satisfactorily, it is more complicated in construction and therefore more expensive to manufacture.

SUMMARY OF THE INVENTION

The axle trunnion lubrication system of this invention solves the previously-noted servicing problems by eliminating all crawling under the vehicle as well as all periodic maintenance in regard to the lubrication of these trunnion bearings. In addition, the lubrication system of this invention neither requires fluid communication with the interior of the differential housing nor does it utilize the lubricant contained within the differential housing.

The lubrication system of this invention makes use of cored or hollow trunnion support castings that are filled with lubricating fluid and thus, in addition to their trunnion support function, also act as lubricating fluid reservoirs. These lubricating fluid reservoirs, which extend both above and below the trunnion bearing bores are connected via fluid passage means with the trunnion bearings so as to permit the flow of lubricating fluid from the reservoirs to the trunnion bearings.

In addition, further fluid passage means are utilized to fluidly connect the trunnion bearings with thrust bearings and to permit the flow of lubricating fluid from the trunnion bearings to the thrust bearings. In addition, the thrust plate together with a thrust plate cover and the thrust bearings themselves define a cavity that is adapted to hold lubricating fluid.

Thus, according to the present invention, a novel arrangement of components is provided to permit the lubrication of both the trunnion and thrust bearings by utilizing the hollow trunnion supports as lubricating fluid reservoirs. This construction is both simple, foolproof, inexpensive and needs no moving parts. A further benefit of this construction is that these lubricant-filled trunnion supports provide lifetime lubricant reservoirs, with no service or periodic maintenance being required under normal operating conditions.

Other features and advantages of the invention will become more readily understood by persons skilled in the art when following the detailed description in conjunction with the several drawings.

BRIEF DESCRIPTION OF THE DRAWINGS

FIG. 2 is a simplified end view of the rear trunnion support incorporating an annular sleeve bearing and a wear sleeve associated therewith.

DESCRIPTION OF THE PREFERRED EMBODIMENT

Figure 1:
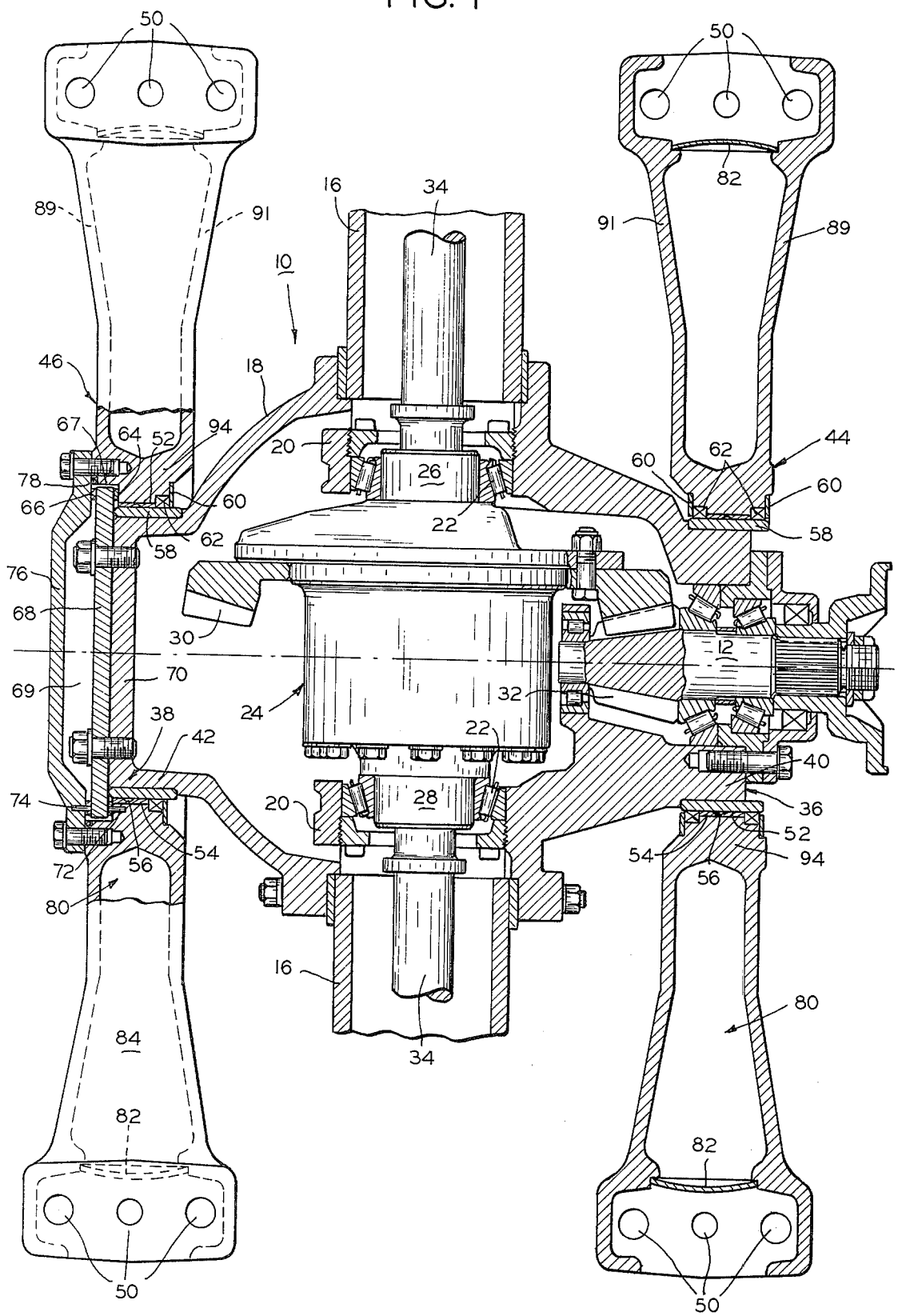
FIG. 1 is a top plan view, partially broken away, of a trunnion mounted axle that incorporates the lubrication system of this invention.

Referring now to the drawings, particularly FIG. 1, there is illustrated a pivoting axle assembly shown generally at 10 which may, for example, be attached to the rear or tractor portion of a vehicle which also includes a front implement unit, such as a loader, with the tractor unit and implement unit being joined together by means of a vertical steering coupling so as to provide an articulated vehicle. An example of such an articulated vehicle is shown in U.S. Pat. No. 3,563,329 to Licari. As is well known in the art, the tractor unit includes an engine and transmission (not shown) that are operatively connected to power a pair of the rear wheels. A drive line and U-joint system transmit power from the transmission to the oscillating, pivoting or swing axle assembly 10 through an input member or pinion shaft 12.

Axle assembly 10, which is more or less conventional, includes a pair of oppositely extending axle housing portions 16, intermediate the inner ends of which is secured a differential housing or "banjo" structure portion 18. It will be understood that the "banjo" housing includes housing portion 18 and a cover (not shown), substantially enclosing a central lower portion of the assembly and forming a lubricant sump in the bottom thereof. Structure portion 18 is provided with laterally spaced surrounding portions 20 adjacent the inner ends of each axle housing 16, respectively, with anti-friction bearings 22 being carried by supporting portions 20.

A differential casing 24, preferably formed in two parts, is rotatably carried on spaced bearings 22 by opposed sleeve portions 26 and 28 formed on casing 24. Casing 24 is also provided with an annular flange to which is secured, for rotation therewith, a ring gear 30. Ring gear 30 and casing 24 are driven by a beveled pinion 32 which is keyed to input or pinion shaft 12 adjacent the innermost end thereof. Pinion shaft 12 is rotatably carried by a plurality of anti-friction bearings in a manner well known in the art.

The gear assembly (not shown) housed within differential casing 24 may be of any form of construction which is suitable for the transmission of power from pinion 32 to axle shafts 34 which extend coaxially of the axle housing portions 16, respectively.

Differential housing portion 18 of axle assembly 10 is transversely rockable on a front and rear trunnion arrangement shown generally at 36 and 38, respectively. As best seen in FIG. 1, front and rear trunnions 36 and 38 respectively are conveniently formed as integral and axially aligned front and rear portions 40 and 42 respectively, of differential housing 18. A front trunnion support 44 and a rear trunnion support 46 are disposed on either side of differential housing 18 and are secured to a pair of vehicle frame members (not shown) through a plurality of bolts (not shown) that pass through apertures 50.

Rear trunnion 38 is supported within rear trunnion support 46 by a sleeve bearing 52 of preferably cylindrical construction, attached to cylindrical through bore 54 of trunnion support 46. The inner surface of sleeve bearing 52, which is preferably provided with a continuous central groove 56, bears against the outer surface of a cylindrical wear sleeve 58 which surrounds and is physically attached to rear trunnion 38. The outer surface of wear sleeve 58 takes the form of a generally cylindrical bearing surface. The inner end of trunnion bore 54 is closed off by a retaining plate 60 which also serves to retain a seal 62.

Axial end thrust of axle assembly 10, relative to the vehicle, is taken up by a pair of opposed annular thrust washers 64 and 66 whose opposed inner surfaces can be contacted by the opposite sides of a thrust plate 68 bolted to the circular end face 70 of rear trunnion 38. Trunnion support 46 is provided with a peripheral recess or step 67 in its bore 54 to permit the insertion of the outer portion of plate 68. Inner thrust washer 64 is attached to rear trunnion 38 by a plurality of pins 72 whereas outer thrust washer 66 is held, by a plurality of pins 74, to the inner surface of a cover plate 76 bolted to rear trunnion support 46. An O-ring seal 78 prevents the discharge of lubricant between cover plate 76 and rear trunnion support 46.

Similar to the preceding description with reference to rear trunnion 38, front trunnion 36 is also provided with a wear sleeve 58 and sleeve bearing 52 is attached to the cylindrical bore 54 of front trunnion support 44. A pair of retaining plates 60 are removably secured on either side of front trunnion support 44 and are adapted to also contain a pair of seals 62 therein.

It should be understood at this time that front and rear trunnions 36 and 38 respectively are transversely rockable or pivotable via their wear sleeves 58 against sleeve bearings 52 in front and rear trunnion supports 44 and 46 respectively. These trunnion and bearing arrangements are of conventional construction, with the thrust function being taken care of by thrust plate 68 and opposed thrust washers 64 and 66.

Sleeve bearings 52 as well as thrust washers 64 and 66 are preferably of a metallic composition and therefore require lubrication. To this end, front and rear trunnion supports 44 and 46 take the forms of cored castings which in addition to their support function also serve as lubricant reservoirs 80. As best seen in FIG. 2, rear trunnion support 46, which is so substantially similar to front trunnion support 44, that the latter need not be described separately, has its end portions, containing apertures 50, closed off by means of expanding plugs 82. The trunnion support upper wall portion 84 is provided with a filler plug 86 and a vent plug 88, whereas curved bottom wall portion 90 is provided with drain plug 92. These top and bottom wall portions are joined by side wall portions 89 and 91. The generally-cylindrical center wall portion 94 is provided with preferably vertically-directed upper and lower apertures 95, 96 (FIG. 2) axially aligned with upper and lower apertures 97 and 98, respectively, in sleeve bearing peripheral central groove 56.

Each of the front and rear trunnion support reservoirs 80 is initially filled with lubricant, with conventional vent plug 88 permitting excess lubricant to escape in the case of lubricant expansion. The lubricant then enters sleeve bearing central groove 56 via central wall upper and lower apertures 95, 96, respectively, and groove apertures 97, 98, respectively, in order to perform its lubricating function. The escape of lubricant from front trunnion arrangement 38 is prevented by seals 62, whereas a small amount of lubricant can escape from the clearance between rear trunnion support bearing 52 and wear ring 58 in a rearward or outwardly direction to provide lubricant for thrust washers 64 and 66. In time, the cavity 69, formed between thrust plate 68, cover plate 76 and thrust washers 64 and 66, will completely fill with lubricant, with the escape therefrom being prevented by O-ring seal 78.

Under normal operating conditions, lubricant-filled trunnion supports 44 and 46 contain enough lubricant to provide lifetime lubrication for front and rear trunnions 36 and 38, respectively, with no service or periodic maintenance being required. This arrangement is simple, foolproof, inexpensive and has no moving parts. In contrast to the prior art structures, no periodic lubricant replenishment is necessary and no fluid communication is required with the interior of the differential housing.

It should be understood that the structural details and functional relationships of the sleeve bearings relative to the wear sleeves could of course be modified. For example, instead of having a groove in the sleeve bearing, the groove could readily be incorporated into wear ring. Furthermore, the apertures from reservoir 80 into the bearing-wear sleeve interface need not be vertically directed.

From the foregoing, it is believed that those familiar with the art will readily recognize and appreciate the novel concept and features of the present invention. Obviously, while the invention has been described in relation to only a limited number of embodiments, numerous variations, changes and substitutions of equivalents will present themselves to persons skilled in the art and may be made without necessarily departing from the scope and principles of this invention. As a result, the embodiment described herein is subject to various modifications, changes and the like, without departing from the scope and spirit of the invention with the scope thereof being determined solely by reference to the claims appended hereto.

What is claimed is:

1. In a vehicle having a frame and an axle support assembly, comprising in combination a swing axle, a trunnion bearing assembly for supporting said axle and a lubrication system for said bearing assembly, said lubrication system comprising:

a. a pair of co-axial cylindrical trunnion members secured to and operative to support said axle, each of said trunnion members having an outer bearing surface;

b. a pair of support members, attached to said vehicle frame, each support member having a through bore therein and receiving the bearing surface of one of said trunnion members;

c. first bearing means interposed between the bearing surface of at least one of said trunnion members and the through bore of at least one of said support members;

d. said at least one of said support members being adapted to hold lubricating fluid; and e. first passage means in fluid communication with said first bearing means and said at least one support member to permit the flow of lubricating fluid from said at least one support member to said first bearing means.

2. The combination of claim 1 further including:

a. a cover plate attached to and sealingly closing off the outer end of the through bore of one of said support members;

b. said through bore of said one of said support members having a stepped portion adjacent to said cover plate and cooperating therewith to form a peripheral groove;

c. a thrust plate attached to an end surface of one of said trunnion members, said thrust plate having opposed annular surface portions thereof extending into said peripheral groove;

d. second bearing means interposed between said peripheral groove and said thrust plate opposed annular surface portions; and e. second passage means in fluid communication with said first bearing means and said peripheral groove to permit the flow of lubricating fluid from said first bearing means to said second bearing means.

3. The combination of claim 2 wherein said cover plate together with said thrust plate and said second bearing means defines a cavity adapted to hold lubricating fluid.

4. The combination of claim 2 wherein said second passage means takes the form of the clearance between said first bearing means and the bearing surface of said at least one of said trunnion members.

5. The combination of claim 1 wherein said at least one support member takes the form of a cored or hollow casting that is filled with lubricating fluid and thus, in addition to its trunnion support function, also acts as a lubricating fluid reservoir.

6. The combination of claim 5 wherein said lubricating fluid reservoir extends both above and below said through bore.

7. The combination of claim 6 wherein said lubricating fluid reservoir is provided with a filler plug and a vent plug above said through bore and a drain plug below said through bore, said vent plug permitting excess lubricating fluid to escape in the event of lubricant expansion.

8. The combination of claim 5 wherein said at least one of said support members has a central wall portion separating said through bore from said lubricating fluid reservoir and said first passage means includes a first aperture through said central wall portion for fluidly connecting the lubricating reservoir with said through bore.

9. The combination of claim 8 wherein said first passage means further includes a second aperture through said first bearing means in axial alignment with said first aperture for fluidly connecting said first bearing means with said through bore.

10. The combination of claim 9 wherein said first and second apertures extend radially and vertically through said central wall and said first bearing means, respectively.

* * * * *

Disclaimer 3,949,826.—*Noah A. Shealy*, Niles, Mich. LUBRICATION SYSTEM FOR TRUNNION MOUNTED AXLE. Patent dated Apr. 13, 1976. Disclaimer filed Aug. 11, 1978, by the assignee, *Clark Equipment Company*.

Hereby enters this disclaimer to claims 1, 2, 3 and 4 of said patent.

[*Official Gazette October 3, 1978.*]